US008627210B2

(12) United States Patent
Vijayakumar et al.

(10) Patent No.: US 8,627,210 B2
(45) Date of Patent: Jan. 7, 2014

(54) CONTEXT ENHANCED SOCIAL NETWORK FOR MEETING PARTICIPANTS (75) Inventors: Nithya Vijayakumar, Sunnyvale, CA (US); Sanjeev Kumar, Milpitas, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 12/506,423

(22) Filed: Jul. 21, 2009

(65) Prior Publication Data

US 2011/0022967 A1  Jan. 27, 2011

(51) Int. Cl.
*G06F 3/01* (2006.01)

(52) U.S. Cl.
USPC .......................................................... 715/753

(58) Field of Classification Search
USPC .......................................................... 715/753
See application file for complete search history.

(56) References Cited

U.S. PATENT DOCUMENTS

| | | | |
|---|---|---|---|
| 6,486,898 B1 * | 11/2002 | Martino et al. | 715/853 |
| 7,243,109 B2 * | 7/2007 | Omega et al. | 707/737 |
| 7,249,123 B2 * | 7/2007 | Elder et al. | 1/1 |
| 7,668,304 B2 * | 2/2010 | Coughlan et al. | 379/202.01 |
| 7,979,411 B2 * | 7/2011 | Mattox et al. | 707/706 |
| 8,010,459 B2 * | 8/2011 | Buyukkokten et al. | 705/319 |
| 8,332,782 B1 * | 12/2012 | Chang et al. | 715/853 |
| 8,346,864 B1 * | 1/2013 | Amidon et al. | 709/204 |
| 2004/0088325 A1 * | 5/2004 | Elder et al. | 707/104.1 |
| 2005/0159998 A1 * | 7/2005 | Buyukkokten et al. | 705/11 |
| 2005/0256866 A1 * | 11/2005 | Lu et al. | 707/5 |
| 2009/0006608 A1 * | 1/2009 | Gupta et al. | 709/224 |
| 2010/0050093 A1 * | 2/2010 | Behrens et al. | 715/753 |

OTHER PUBLICATIONS

Dr. David Krackhardt, "Krackplot Software (A Social Network Visualization Program)", Carnegie Mellon Heinz School, 2006.

Liu et al., "Algorithm of Mining Fuzzy Association Rules in Network Management", Proceedings of the Second International Conference on Machine Learning and Cybernetics, Xi'an, Nov. 2-5, 2003.

Snijders, "Accounting for Degree Distributions in Empirical Analysis of Network Dynamics", National Academy of Sciences, Dec. 2002.

UCINET Quick Start Guide, Feb. 15, 2010.

Garton et al., "Studying Online Social Networks", JCMC 3 (1); SIG Group Bulletin, Jun. 1997, pp. 1-29.

(Continued)

*Primary Examiner* — Omar Abdul-Ali
*Assistant Examiner* — Anil Bhargava
(74) *Attorney, Agent, or Firm* — Edell, Shapiro & Finnan, LLC (57) ABSTRACT

Methods, apparatus, and logic are provided to generate a context enhanced social network (CESN) participant list for meeting participants. One method includes obtaining a list of participants and a meeting context and identifying expert knowledge that is required for the context. Degrees of associations between a first participant and the other participants are calculated based on a level of expert knowledge of the participants. The CESN participant list is generated and displayed for the first meeting participant based on the calculated degrees of associations of the other participants. The method can be repeated such that a unique CESN participant list is generated for each meeting participant based on his perspective in relation to the other meeting participants and based on the current context of the meeting. The CESN participant lists may also be dynamically updated when a change in meeting context is detected.

21 Claims, 10 Drawing Sheets

(56) References Cited

OTHER PUBLICATIONS

Henri ter Hofte et al., "Dynamic Personal Social Networks: a new perspective for CSCW research and design", SIG Group Bulletin, vol. 24, Issue 3, Dec. 2003.

Towle, "Measuring and Evaluating the Underlying Social Networks of Visual Blog Communities", CSCW Workshop on Social Networks, Nov. 2004.

Borgatti, "UNCINET 6 for Windows Software for Social Network Analysis", User Guide, 1999-2002, Analytic Technologies, Inc., pp. 1-47.

* cited by examiner

THIS EXAMPLE DATA SET OF A SOCIAL NETWORK INCLUDES DISTANCE BETWEEN PARTICIPANTS (DBP) AND DEGREE OF ASSOCIATION (DOA) AS CALCULATED WITH RESPECT TO ALEX AND EXPERTISE LEVEL (EL) WITH RESPECT TO WEB 2.0

| CURRENT CONTEXT: WEB 2.0 | | | |
|---|---|---|---|
| PARTICIPANT | DBP | EL | DOA |
| BOB | 2.0 | 0.40 | 2.8 |
| CATHY | 2.0 | 0.97 | 1.5 |
| ... | | | |
| PARTICIPANT n | d | e | a |

CONTEXT ENHANCED SOCIAL NETWORK FOR MEETING PARTICIPANTS

TECHNICAL FIELD

The present disclosure relates to a context enhanced social network that is useful in web conferencing applications.

BACKGROUND

Web conferencing services, such as Cisco's Unified MeetingPlace™ virtual meeting application and Cisco's WebEX™ web-based meeting software, have become prevalent in today's workplace. Such web conferencing tools eliminate the cost of travel and save valuable time. With increased collaboration among persons at multiple different locations, people need to continuously learn new names and faces, contributing to an ever expanding list of social or professional connections. However, conventional web conferencing tools are limited in the amount of information automatically available to a user (e.g., a meeting participant) about the other participants (e.g., what degrees the participant has earned, which schools the participants have attended, in which department the participants work, what published documents the participants have authored, etc.).

This kind of information can be very useful to the user to determine which participant has relevant expertise with regard to a context of a meeting and which participants may be more closely connected (e.g., socially or professionally) to the user. Even if such information was made available to the user, he would need to sift through the information to determine which information is relevant to the meeting context and what degree of associations the participants may have with the user. Furthermore, as the number of meeting participants increase, for example, in the case of large conferences with people from varying backgrounds, organizations, and countries (e.g., Worldwide Web consortium (W3C), Internet Engineering Task Force (IETF), or other technical and research conferences) and as the context of the meeting changes, it becomes an especially burdensome task for a user to make such determinations.

DESCRIPTION OF EXAMPLE EMBODIMENTS

Overview

Methods, apparatus and logic are provided to generate a context enhanced social network (CESN) participant list for web conferencing participants. One method includes obtaining a list of participants and a meeting context and identifying expert knowledge that is required for the context. Degrees of associations between a first participant and the other participants are calculated based on a level of expert knowledge of the other meeting participants. The CESN participant list is generated and displayed for the first meeting participant based on the calculated degree of associations of the other participants. The method can be repeated such that a unique CESN participant list is generated for each meeting participant based on his perspective in relation to the other meeting participants and based on the current context of the meeting. The CESN participant lists may also be dynamically updated when a change in meeting context is detected.

Example Embodiments

When people discuss topics within a group of people that they know, they naturally tend to give importance to those people who are considered subject matter experts for the topic currently being discussed. For instance, if a first person is considered an expert in Web 2.0 and a second person is considered an expert in mobility networks and both of them are in a meeting, people tend to place higher importance on what the first person has to say when Web 2.0 is being discussed and likewise, more importance is placed on what the second person has to say when mobility networks are being discussed. However, often meetings occur between participants who are not familiar with one another's expertise in different areas or are simply not familiar with one another. In such meetings, meeting participants do not readily know, for example, whose arguments should be given more importance or who is more approachable on a certain topic.

According to an embodiment described herein, a ranking of meeting participants is computed based on both meeting topic (e.g., based on meeting participants' expertise in the current topic of discussion, based on meeting participants' work experience with technologies relevant to the current topic of discussion, etc.) and how closely the participants are socially connected to each other. In fact, research has shown that personal connection (i.e., how one person is related to another) plays an important role in improving communication effectiveness. Studies have shown that people tend to be more satisfied by an answer from someone they feel related to even if that person is not a subject matter expert as compared to an answer from someone who is a subject matter expert but is not closely related in their "social network." A context enhanced social network is provided that is based on both social distance relationships and expertise with regard to a meeting context.

Conventional online meetings display a directory of meeting participants (e.g., a list of names of those participants who are invited to the meeting or are presently logged in and attending the meeting). A limited amount of information can be obtained from such a directory. For example, the conventional meeting display does not show how the meeting attendees are related to each other. Mere display of participant names and having access to their profile information at a click of a link is inadequate, especially in the case of large conferences with people from varying backgrounds, organizations, and countries (e.g., W3C, IETF, or other technical and research conferences). Research has shown the importance and advantage of social connection in a meeting conversation. For example, people tend to give more weight to talks and arguments from people socially connected to them in some way as opposed to those with no social connection (e.g., people who have graduated from the same school, people who performed research under the same professor, people who have a common subject matter expertise, etc.). Furthermore, such associations that can be identified with respect to the meeting context are especially useful (e.g., a ranking of attendees in terms of how they are related to the user with respect to Web 2.0).

Conventional social networking services (e.g., LinkedIn™, Facebook™, etc.) do not differentiate between someone who is connected to the user personally (e.g., a participant's sister's friend) or professionally (e.g., a participant who worked under the same professor). Furthermore, although these conventional social networking databases identify connections in the network using a degree of association, they, however, do not determine associations that can be identified with respect to a meeting context (i.e., topic of discussion). Rather, the conventional databases generate this information based on a limited set of rules as to who is directly connected to whom. Furthermore, these rules do not distinguish between those connected personally and professionally. When a participant is connected to the user both personally and professionally, conventional social networking systems do not differentiate between these associations, and especially with respect to the context of the meeting.

Figure 1:
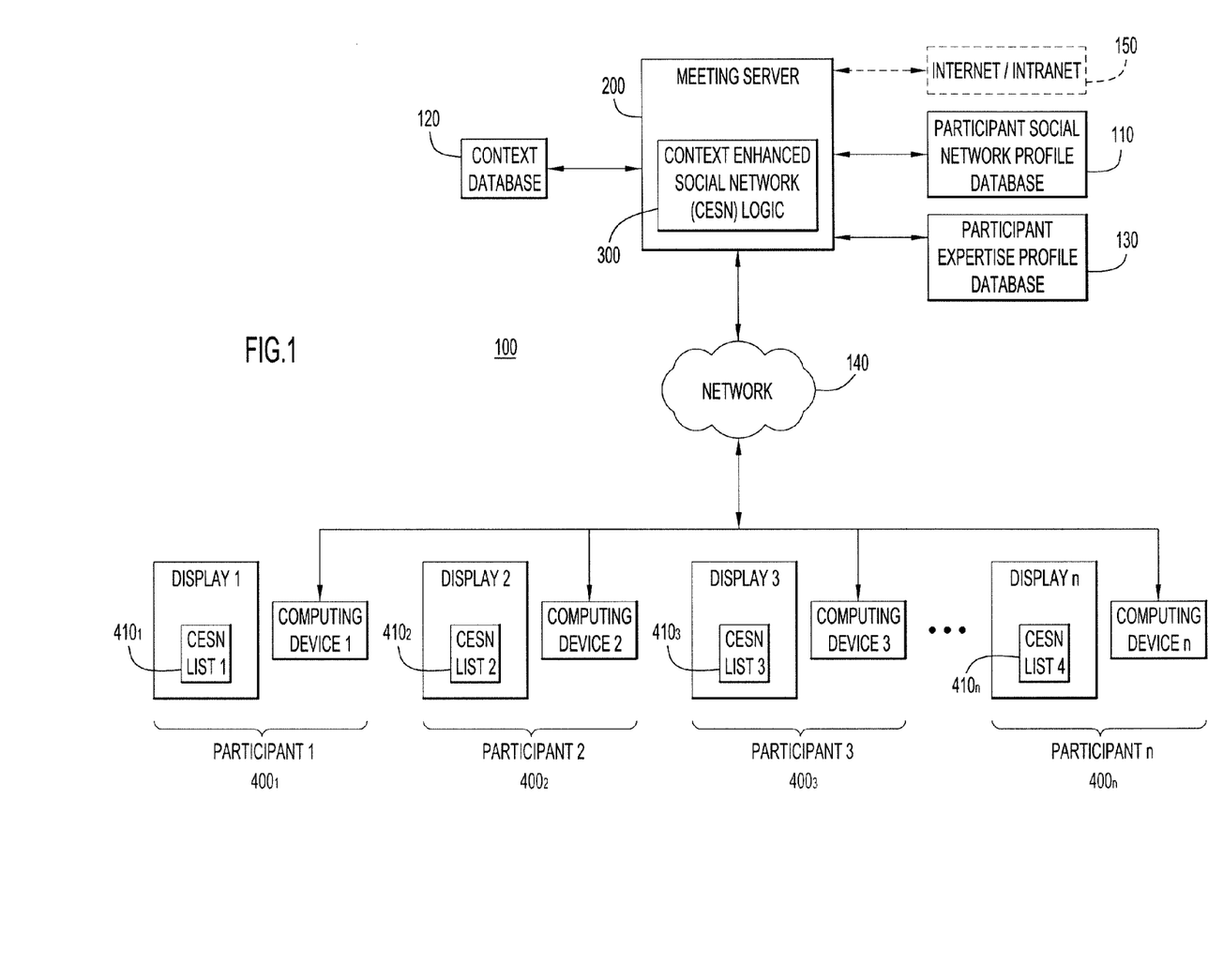
FIG. 1 is a block diagram illustrating an example of a system for providing context enhanced social network functionality for a meeting among multiple meeting participants.

FIG. 1 is a block diagram illustrating an example of a system, according to one embodiment, for providing context enhanced social network functionality for a meeting among multiple meeting participants. System 100 comprises a meeting server 200 with context enhanced social network logic (CESN) 300, a network 140, and computing devices and displays $400_1$-$400_n$ for meeting participants of an online meeting, referred to herein as a "web conference." Meeting server 200 is configured to generate CESN data via CESN logic 300 and forward the data over network 140 to be displayed in CESN lists $410_1$-$410_n$ on the corresponding meeting participants' display devices.

One example of an online meeting is one that is established by the meeting server 200 using technology, such as Cisco's MeetingPlace online meeting service and Cisco's WebEx web-based meeting software. In such a system, each meeting participant logs into a website with meeting identifier information from a computing device (e.g., laptop computer, desktop computer, personal data assistant, BlackBerry™ device, iPhone™ device, or any computing apparatus having Internet connectivity). The computing devices and displays $400_1$-$400_n$ are shown to generically represent such computing devices. Audio from participants may be captured by audio capture capabilities on the computing and display devices $400_1$-$400_n$ or by way of a telephone connection into a teleconference bridge to which each participant has access by way of the meeting server 200. Online meeting services such as MeetingPlace and WebEx provide a shared "workspace" where, once logged in, each participant has a view of a window where materials (e.g., documents, photos, videos, etc.) may be opened and made "active" for viewing and discussion by the meeting participants. This concept of a workspace is described further hereinafter in connection with the operation of the CESN logic 300.

The techniques described herein are also applicable to meetings organized through calendaring software such as Microsoft Outlook™ calendaring software, where participants may dial into a teleconference bridge and participate in a primarily voice-based meeting.

Meeting server 200 is further configured to interact with participant social network profile database 110, context database 120, and participant expertise profile database 130. Optionally, meeting server 200 may be further configured to interact with data sources via a private or public computer network 150 (e.g., the Internet, a corporate intranet, etc.). Participant social network profile database 110 is configured to store information concerning social profile information (e.g., corporate directory information, colleges and/or universities attended, personal information, traditional social network information, etc.) of persons expected to be involved in web conferences. Context database 120 is configured to store meeting context items (e.g., Web 2.0, mobility networking, etc.) and associated expert knowledge data (e.g., related career fields, accredited classes, corporate seminars, departmental responsibilities, relative keyword terminology, etc.). Participant expertise profile database 130 is configured to store information related to expertise of a participant (e.g., university degrees attained, published documents authored, patents, courses attended, job history, etc.).

Figure 2:
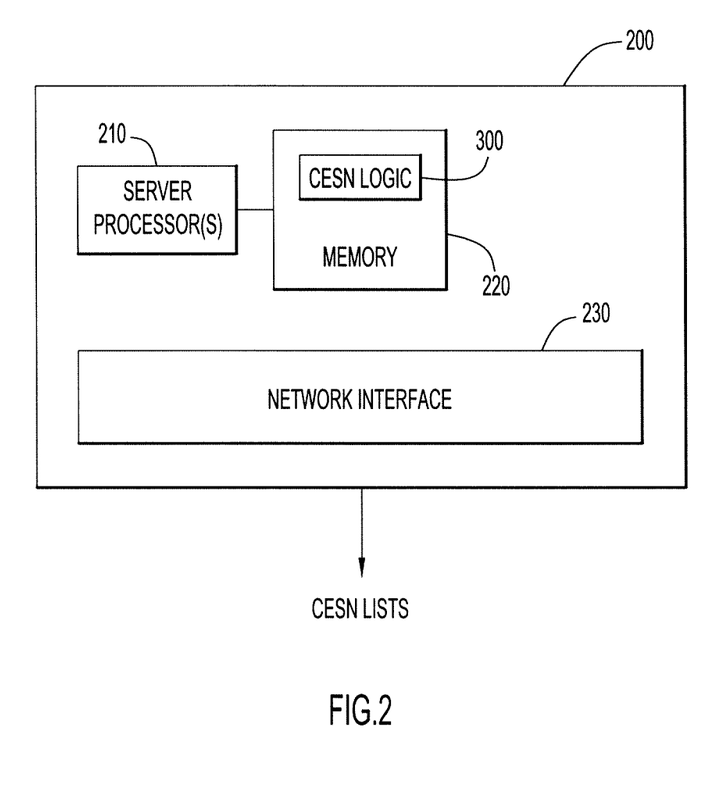
FIG. 2 is a block diagram illustrating an example of a meeting server useful in the system shown in FIG. 1.

FIG. 2 is a block diagram illustrating an example of a meeting server useful in the system shown in FIG. 1. Meeting server 200 comprises server processor 210, memory 220 including CESN logic 300, and network interface 230. Server processor 210 is configured to execute the CESN logic 300 to calculate the degrees of associations (DOAs) between meeting participants with respect to the meeting context in order to generate the CESN lists $410_1$-$410_n$. The meeting server 200 is configured to generate and manage a list of meeting participants, for example, by importing a predetermined list of participants, creating and maintaining a list based on users logged in to participate in a meeting, or by creating and maintaining a list based on users responding via a calendar software to an invitation to join a scheduled meeting, etc. The CESN logic 300 may be embodied as logic in any form encoded in one or more tangible media (e.g., memory, digital logic gates in fixed or programmable form, etc.) for execution by the server processor 210.

The network interface 230 is configured to receive and transmit data to and from the meeting server 200. For example, the network interface 230 is configured to receive data stored in the participant expertise profile database 130 or data stored in the social network profile database 110 for use by the meeting server 200. The network interface 230 is also configured to transmit data (e.g., data representative of the CESN lists $410_1$-$410_n$) generated by the meeting server 200.

The CESN logic 300 dynamically generates degrees of associations between meeting participants during runtime of the meeting based on personal relationships, professional relationships, and participant expertise with regard to the present context of the meeting. CESN logic 300 generates the associations between meeting participants with respect to the meeting context. These associations can be delivered via network 140 to be displayed by the participants' computing devices and displays $400_1$-$400_n$. As the context of the meeting changes from one topic to the next (e.g., items of a meeting agenda), the degrees of associations may be regenerated to reflect the associations based on the current topic. In this way, the meeting participants can obtain valuable information during the meeting about other participants with respect to different topics in a meeting agenda.

According to one embodiment, when a participant enters the meeting (i.e., logs in), he can find his degrees of associations to other participants. Each degree of association is generated based on the current meeting context. For example, when Alex enters the meeting, he is able to view a list of meeting participants. By clicking on the names of each participant, Alex can view an association profile and a degree indicator represented, for example, as a numerical value or graphical image (e.g., a digital image, an icon, an avatar, etc). Furthermore, the degree of associations can be further distinguished, for example, by allocating visual attributes (e.g., highlighting, coloring, etc.) to the indicator. The degree of association indicates how the other participants are related to Alex with respect to the meeting context (e.g., Web 2.0). Thus, Alex can be directly related (e.g., first degree contact) to Cathy when discussing Web 2.0 as they represent different companies in a Web 2.0 working group. When the meeting context changes to the next agenda item (e.g., mobility networking) Alex and Cathy may be three degrees apart. Whereas, Bob who works on mobility under a manager that Alex previously worked for may now be a first degree contact of Alex.

In one embodiment, the meeting participants can obtain the degree of association information of other participants beforehand based on the meeting agenda. This enables the participants to know the attendees and their expertise prior to the meeting. In another embodiment, when the meeting context changes to the next agenda item during the meeting, the associations are regenerated in real-time according to the new context.

Figure 3:
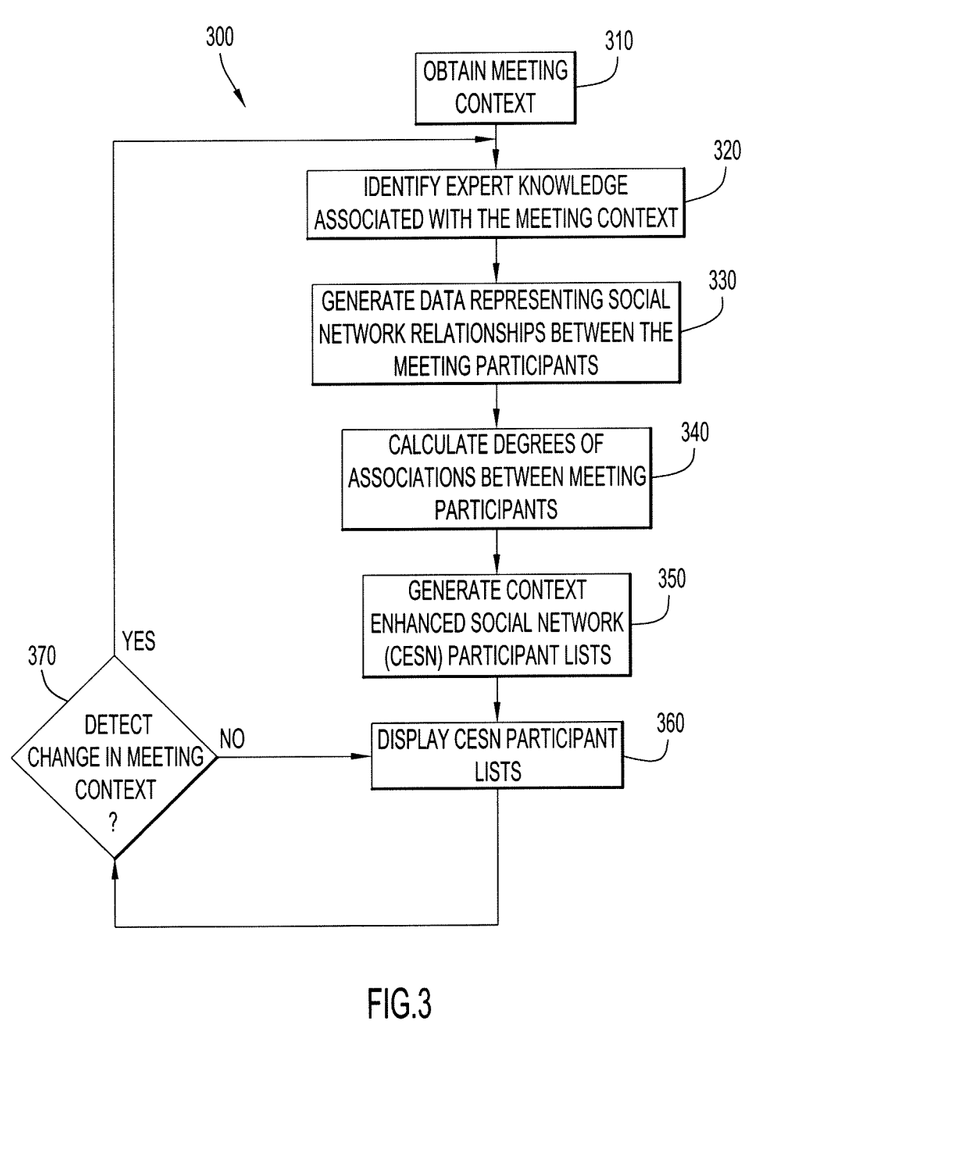
FIG. 3 is a flowchart illustrating an example of a method of providing the context enhanced social network.

FIG. 3 is a flowchart illustrating an example of a method of providing the context enhanced social network. At 310, a meeting context is obtained. The meeting context can be obtained, for example, from a meeting agenda. For formal meetings and larger meetings, a meeting agenda is typically specified (e.g., entered into a software calendar application (e.g., Outlook™), embedded into a presentation displayed within a shared workspace of the online meeting, etc.). Alternatively, if a meeting agenda is not defined beforehand, the agenda items could be specified by the meeting organizer during the meeting (e.g., by entering a keyword into a field of a shared workspace of the online meeting, by activating a document within the shared workspace, by keyword voice recognition, etc.). Once the agenda item under discussion is identified, the context is derived from it. For example, the meeting server 200 queries context database 120 to identify the context of agenda item based on, for example, relative keyword terminology. Furthermore, solutions such as expert systems or neural networks are useful to identify the context from the agenda. The meeting organizer/moderator can also set the context. If presentation slides are used, deriving the meeting context may, for example, be obtained directly from the text and title in the slides. In the absence of any written material, for example, speech recognition systems could be used to detect keywords being discussed to identify the context.

Meeting context may be obtained from the meeting agenda set by the meeting organizer. Furthermore, predetermined association rules may be used to map meeting keywords to context information. Except for adhoc meetings, a well defined agenda is typically set (e.g., via calendaring software) prior to the meeting time for many meetings (e.g., online training, group discussions, inter-company executive meetings, standard working group meetings, etc.). In the event that new meeting agendas are introduced during the course of a meeting, then the meeting organizer or host may add this information into the meeting system and the meeting server 200 will dynamically adjust the CESN lists $410_1$-$410_n$ in real-time to the new context when it is being discussed.

At 320, expert knowledge associated with the meeting context is identified. The expertise that is relevant for the current context can be obtained from context database 120. The context database can be populated from a variety of sources including but not limited to: user input, written documents, and feedback from meeting participants. For example, in a call center, the agents' expertise information is stored in databases and is used for call routing based on expertise rankings of the agents. Similar type of information (e.g., expertise knowledge) can be stored in in-house databases (e.g., a corporate database) for enterprise users and can be used for this purpose. A semantic web-based solution can also be used to identify the needed expertise in a certain topic. Furthermore, expertise can be weighted by relevance according to context.

At 330, data representing social network relationships between the meeting participants is generated. The expertise information of the meeting participants for the given meeting context is used to generate a social network of the meeting participants. Also personal and professional connections in the social network are differentiated and the connections that are more relevant to the current meeting context (i.e., topic of discussion) are given higher importance. Social networks can be built using one of the many conventional algorithms, for example, a social network analysis software (e.g., UCINet™) and a social network visualization program (e.g., KrackPlot™). These conventional analysis algorithms and visualization programs are well-tested and empirically validated on large data sets to accurately compute closeness among the network members based on various factors. Any of the several algorithms available can be used and modified to include meeting context as a factor. For example, communication patterns between participants using multiple devices can be used as input data for creating the social network. Traditional online social networking services (e.g., LinkedIn, MySpace™, etc.) which allow users to add/accept connections manually can also be used in the construction of the social network.

At 340, degrees of associations between meeting participants are calculated. When calculating the degrees of associations (i.e., social distance based on meeting context), social network algorithms (e.g., UCINet, KrackPlot, etc.) use different parameters in building connection paths between participants. According to one embodiment, the different parameters are combined based on weights relative to the meeting context. In other words, the meeting context can be used as a dynamic weighting factor in tuning of the social network to distinguish the associations between meeting participants. The actual values of these weights may be calculated by running experiments and based on heuristics. The expertise information of the expertise profile database 130 is combined with the social connections of the social network profile database 110 based on the current context of the meeting to identify new paths and ordering for the CESN. This translates degrees of associations (i.e., social distance based on meeting context) that will use the relative expertise ranking of the participant to an actionable number.

At 350, CESN participant lists $410_1$-$410_n$ are generated based on the degrees of associations for each participant. In other words, unique social network lists are generated for each meeting participant, which are based on the individual participant's own social network associations and the expertise of the other meeting participants with regard to the current meeting context.

At 360, the CESN participant lists are displayed. Meeting server 200 forwards the generated CESN lists $410_1$-$410_n$ via network 140 to be displayed on the respective participant's display. These CESN lists can be displayed in any fashion to represent participants in an online meeting. For example, these lists may include names, numbers, or graphical images showing connections between participants. Examples of display techniques are described hereafter in connection with FIGS. 4 and 6-10.

At 370, a change in meeting context is detected. Examples of ways to detect a change in meeting context include but are not limited to: a meeting host updating an agenda item (e.g., indicating the current meeting context) in the system during the meeting, agenda items may be detected from text in an active document (e.g., a slideshow presentation), and changing between active materials of a shared workspace of the online meeting. Other techniques include a voice recognition tool detecting a change in meeting context, for example, by identifying keywords in the dialogue of the meeting. The functions 320 and 340-360 are repeated for the new context and this process may repeat accordingly as the context changes during a meeting.

System 100 allows for the integration of a dynamic CESN with an online meeting application. The participants are ranked according to the calculated degrees of associations (i.e., social distance) and CESN lists are displayed in the respective participant's display devices $410_1$-$410_n$, for example, in a portion of the display adjacent a shared meeting space of the online meeting. The social distances of the CESN lists $410_1$-$410_n$ are different for each participant as it is calculated with respect to his respective social network.

The participant can find more information, for example, by clicking on each participant's name listed in the CESN list. For example, a participant can view detailed information used to calculate another participant's expertise level with respect to a meeting context. As another example, a participant can view detailed information regarding another participant's CESN list. In other words, the meeting server may manage rights or permissions so as to deliver data to a participant so that data is displayed for a CESN list from his own perspective and data for a CESN list from other participants' perspectives as well. The amount of information that can be made available with the meeting application may be bound to the policy and privacy restrictions.

When the meeting context changes, meeting server 200 detects the change in context and identifies expert knowledge associated with the new meeting context. Then, meeting server 200 recalculates the degree of associations between the meeting participants and generates new CESN lists showing a new ordering of the meeting participants based on the newly computed social network and expertise information. According to one embodiment, the meeting server 200 is configured to recalculate degree of associations and generate a new reordered CESN list for a meeting participant in response to the meeting participant selecting a meeting context that is different from the current meeting context.

Figure 4:
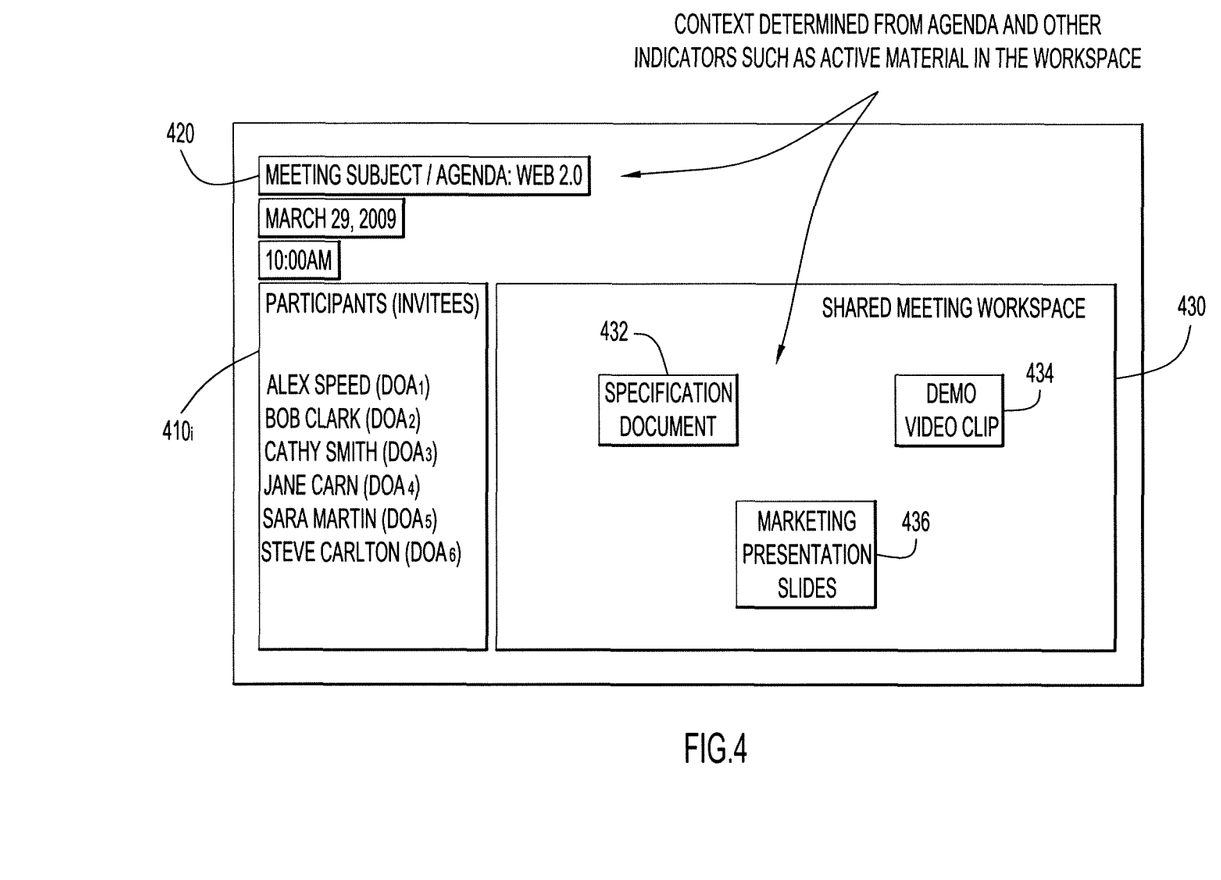
FIG. 4 is an example of a display screen that the meeting participants may see during a meeting and from which meeting context information is derived.

FIG. 4 illustrates an example of a display screen that a meeting participant may see during a meeting. For example, FIG. 4 shows a meeting context field 420 field in the upper left hand corner, a CESN list $410_i$ in the lower left hand corner of the screen, and a shared meeting workspace 430 in the center of the screen. FIG. 4 further shows, for example, that the current agenda item is Web 2.0 and that the meeting participants are ranked with individual DOAs with respect to the meeting context (i.e., Web 2.0). FIG. 4 further shows that several materials, i.e., specification document 432, demo video clip 434, and marketing presentation slides 436, are available to be shared in the shared workspace 430. The meeting context can be obtained, for example, from the meeting agenda or from active materials of the shared workspace 430.

Figure 5:
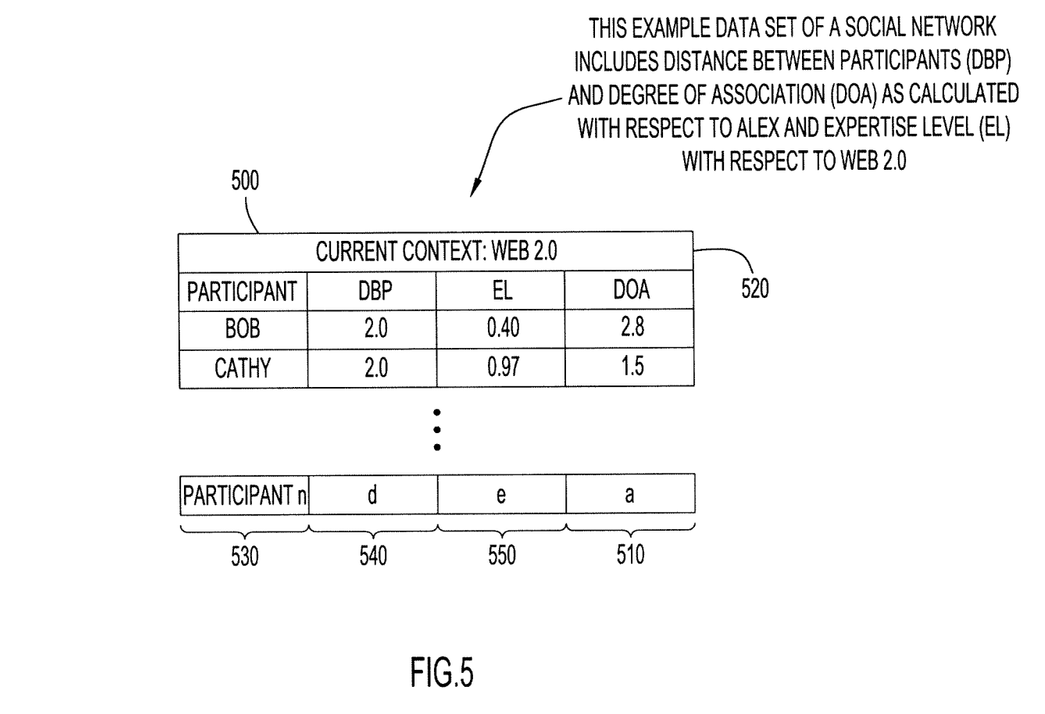
FIG. 5 is an example social network data set including degree of association calculations based on a current context.

FIG. 5 illustrates an example of a social network dataset 500 including degree of association calculations 510 made based on a current context 520. As explained above, the meeting server 200 uses a well structured data set 500 that is populated with information available from many sources including "team work spaces" (e.g., participants, authors of shared documents, discussions, etc.), directory lookup, available corporate networking information, social networking sites (e.g., MySpace, LinkedIn, etc.), Web 2.0 tools (e.g., tags used in blogs), and Internet search engines (e.g., Google™). The meeting server 200 uses weighted inputs and confidence measures to accurately provide a single DOA between two meeting participants with respect to the meeting context (e.g., Web 2.0).

The example dataset 500 shown in FIG. 5 includes a list of participants 530 with social network data including DOA 510, distance between people (DBP) 540, and expertise level (EL) 550. DBP 540 is a set of data values indicating social network connectivity between one of the participants (e.g., Alex) and each of the other participants (e.g., Bob, Cathy, etc.) and is calculated from the perspective of the one participant. EL 550 is a set of data values indicating the expertise level of each participant and is calculated with respect to the meeting context (e.g., Web 2.0). DOA 520 is a set of data values indicating a degree of association between one of the participants (e.g., Alex) and each of the other participants (e.g., Bob, Cathy, etc.), respectively. The DOA 520 is calculated with respect to the other participant's DBP (i.e., social network connectivity to the one participant) and EL (i.e., expertise level relative to the current meeting context). In other words, the DOA indicates how much of an expert the other participants (e.g., Bob, Cathy, etc.) are with respect to the current meeting context (e.g., Web 2.0) and how closely the other participants are socially connected to the one participant (e.g., Alex).

In the example shown in FIG. 5, Alex, Bob and Cathy are online meeting participants where the current topic of discussion is Web 2.0 and dataset 500 has been calculated from Alex's perspective. When Alex logs into the online meeting, the system computes the social network connectivity of the meeting participants from Alex's perspective. For example, CESN logic 300 uses an algorithm, for example, a social network analysis software (e.g., UCINet) to compute the DBP between meeting participants Alex and Bob as 2.0 and between Alex and Cathy to be also 2.0. CESN logic 300 determines the EL of Bob as 0.40 and Cathy as 0.97 with regard to Web 2.0, for example, where 0.40 is considered knowledgeable and 0.97 is considered expert. Based on Bob and Cathy's respective DBP and EL, CESN logic 300 calculates the DOA between Alex and Bob to be 2.8 but between Alex and Cathy to be 1.5, for example, where 1.5 is a closer DOA than 2.8.

Figure 6:
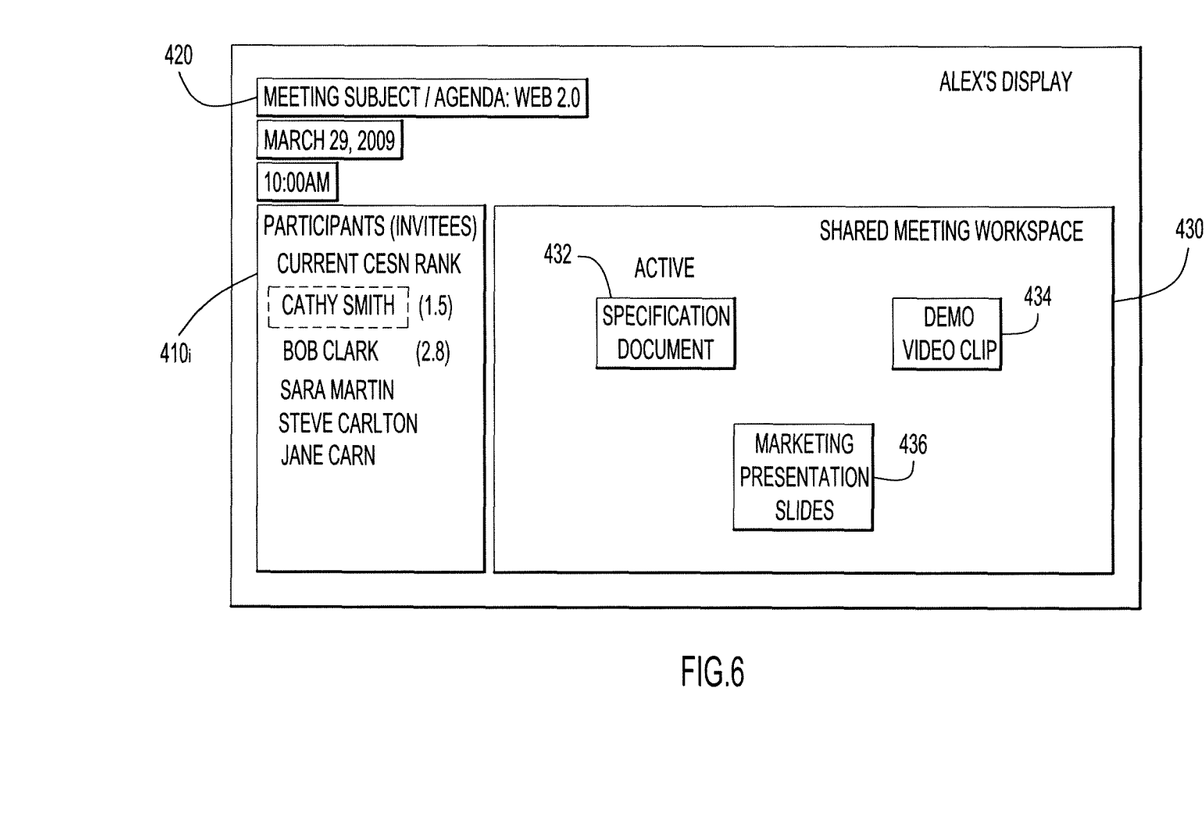
FIG. 6 is an example display screen from a first meeting participant's perspective based on the context of first meeting materials active during the meeting.

FIG. 6 illustrates an example display screen from a first meeting participant's perspective (e.g., Alex's perspective) based on the context (e.g., Web 2.0) of first meeting materials (e.g., Specification document) that are active during the meeting. In this case, from Alex's perspective in the CESN list $410_i$, the meeting participants are ranked according to their expertise with respect to Web 2.0 and their social distance from Alex. As depicted in FIG. 6, Cathy's DOA to Alex based on Web 2.0 is 1.5, whereas Bob's DOA is calculated as 2.8. Although Cathy and Bob are the same social distance from Alex (e.g., DBP values of 2.0 as shown in FIG. 5), Cathy's DOA is closer to Alex as compared to Bob since Cathy is considered a subject matter expert in Web 2.0 and Bob is merely considered knowledgeable in Web 2.0 (e.g., as shown in FIG. 5, EL values of 0.97 and 0.40, respectively).

Furthermore, the listing order of the meeting participants can be made according to their rank based on DOA. For example, Cathy's name appears above Bob's name in the CESN list 410. In addition, some or all of the participants' DOA may be displayed next to their names. For example, those participants (e.g., Sara, Steve, and Jane) who are not considered to have relevant expertise in the current meeting context (e.g., Web 2.0) may be displayed within the list in name only and ranked within the list towards the bottom and ordered according to their respective DBP with respect to Alex. It is to be understood that these lists can be displayed in different formats (e.g., a listing of names, graphical images showing connectivity between participants, etc.) such that they articulate a ranking of the meeting participants based on meeting context and are not limited to the examples provided herein.

Figure 7:
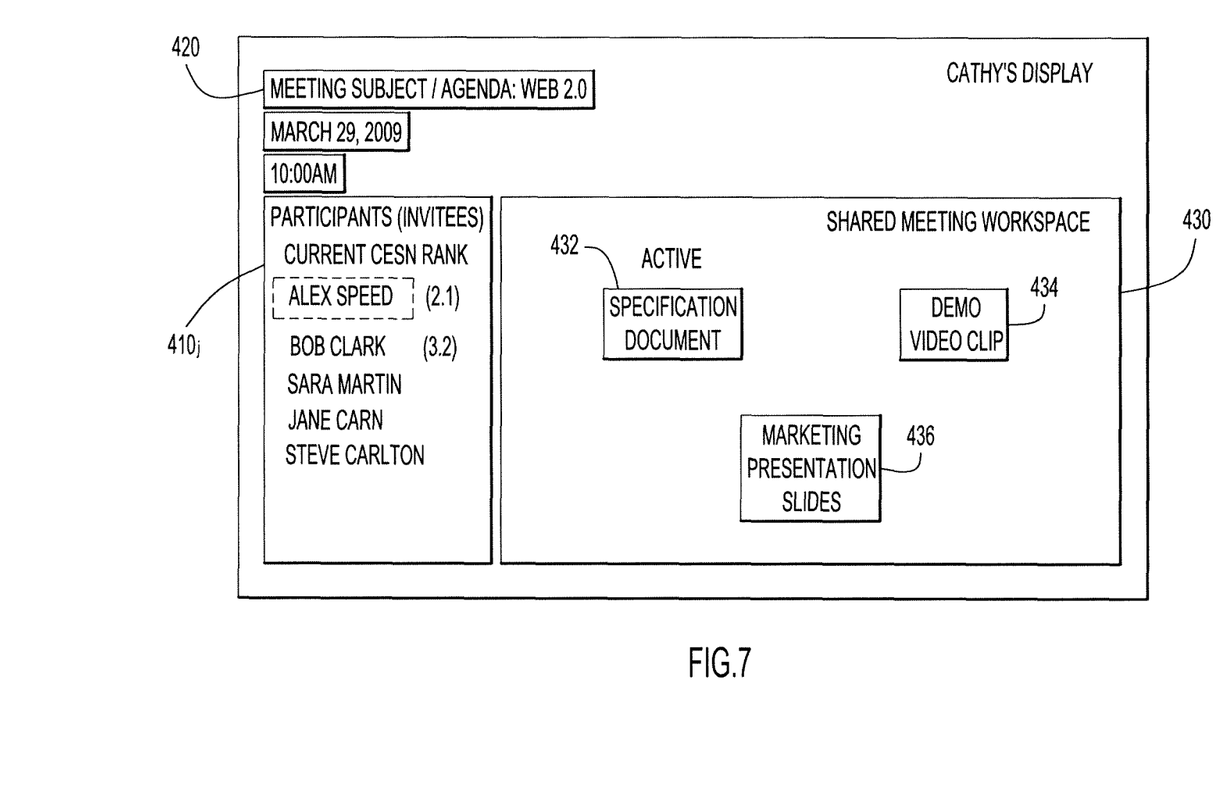
FIG. 7 is an example display screen from a second meeting participant's perspective based on the context of meeting materials active during the meeting.

FIG. 7 is an example display screen from a second meeting participant's perspective (e.g., Cathy's perspective) based on the context (e.g., Web 2.0) of meeting materials (e.g., Specification document) active during the meeting. Cathy's display is similar to Alex's display as shown in FIG. 6, with the exception that Alex now appears in the CESN list and Cathy's name is no longer displayed. A further difference is that Alex's DOA with respect to Cathy and the meeting context Web 2.0 is calculated as 2.1, whereas Bob's DOA with respect to Cathy and Web 2.0 is calculated as 3.2. The inherent difference between Bob's DOA as shown in FIGS. 6 and 7 is that the DOA displayed for Bob in FIG. 6 is calculated with respect to Alex and the one displayed in FIG. 7 is calculated with respect to Cathy.

Figure 8:
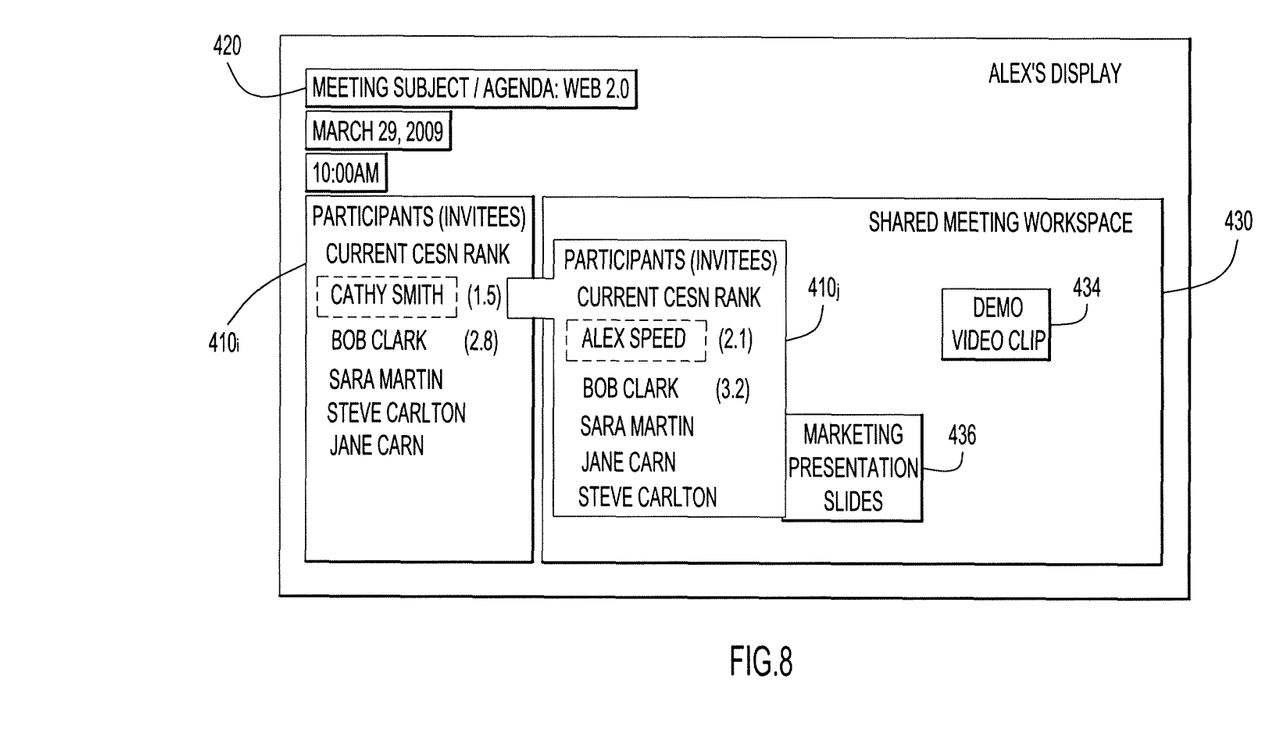
FIG. 8 is an example display screen from a first meeting participant's perspective displaying the degrees of associations of a second meeting participant with respect to the other meeting participants.

FIG. 8 is an example display screen from a first meeting participant's perspective (e.g., Alex's perspective) displaying the degree of associations of a second meeting participant (e.g., Cathy) with respect to the other meeting participants based on the context (e.g., Web 2.0) of meeting materials (e.g., Specification document) active during the meeting. The display shown in FIG. 8 is similar to that of FIG. 6 with regard to being from Alex's perspective, current context (e.g., Web 2.0), and active materials of the shared workspace (e.g., Specification document), with the exception that Cathy's CESN list $410_j$ as illustrated in FIG. 7 now also appears on Alex's screen.

It is to be understood that detailed information can be displayed for one participant about other participants. However, the type and content of the detailed information that can be displayed may be governed based on policy and permissions controlled by the other participants. For example as shown in FIG. 8, a participant (e.g., Alex) can view detailed information regarding another participant's CESN list (e.g., Cathy's list $410_j$). As a further example, one participant can view detailed information used to calculate another participant's expertise level with respect to a meeting context. According to one embodiment, in response to a meeting participant selecting a meeting context that is different from the current meeting context, the degree of associations can be recalculated and a new reordered CESN list can be generated as detailed information to be displayed for the meeting participant.

Figure 9:
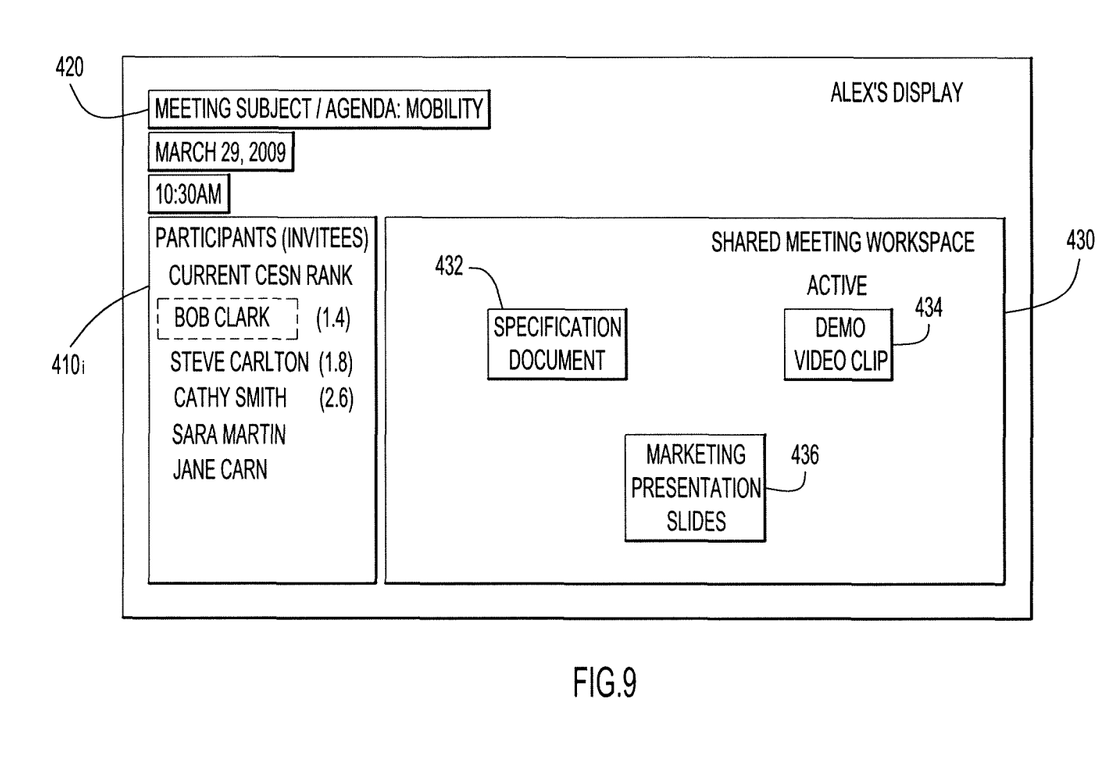
FIG. 9 is an example display screen from the first meeting participant's perspective based on the context of second meeting materials active during the meeting.

FIG. 9 is an example display screen 400 from the first meeting participant's perspective (e.g., Alex's perspective) based on the context (e.g., mobility networks) of second meeting materials (e.g., Demo Video Clip) active during the meeting. Continuing with the example from above, as the meeting context changes to mobility networks, Bob is now considered an expert and Cathy is merely considered knowledgeable. DOAs are used in a network to distinguish the social network connections of meeting participants in an easily interpretable manner. For example, while Cathy is an expert in Web 2.0, Bob is considered an expert in mobility networks.

For example, in Alex's view of the social network as shown in FIG. 9 as compared to that of FIG. 6, Alex and Bob get more closely linked when the meeting context changes to mobility networks. Similarly, Alex and Cathy get more loosely linked when the meeting context changes to mobility networks. Degrees of association can be used to show this distance and ranking among the meeting participants. As seen in FIG. 9, Bob is now ranked at the top of the list with a DOA calculated as 1.4 while Cathy is now ranked further down the list with a DOA calculated as 2.6. Furthermore, as the meeting context changes, participants may be identified as subject matter experts. For example, as shown in FIG. 6, Steve is not considered to have relative expertise with respect to Web 2.0 and is therefore displayed without an associated DOA. However, as shown in FIG. 9, Steve is considered an expert in mobility networks and therefore appears towards the top of the list with a calculated DOA of 1.8.

Figure 10:
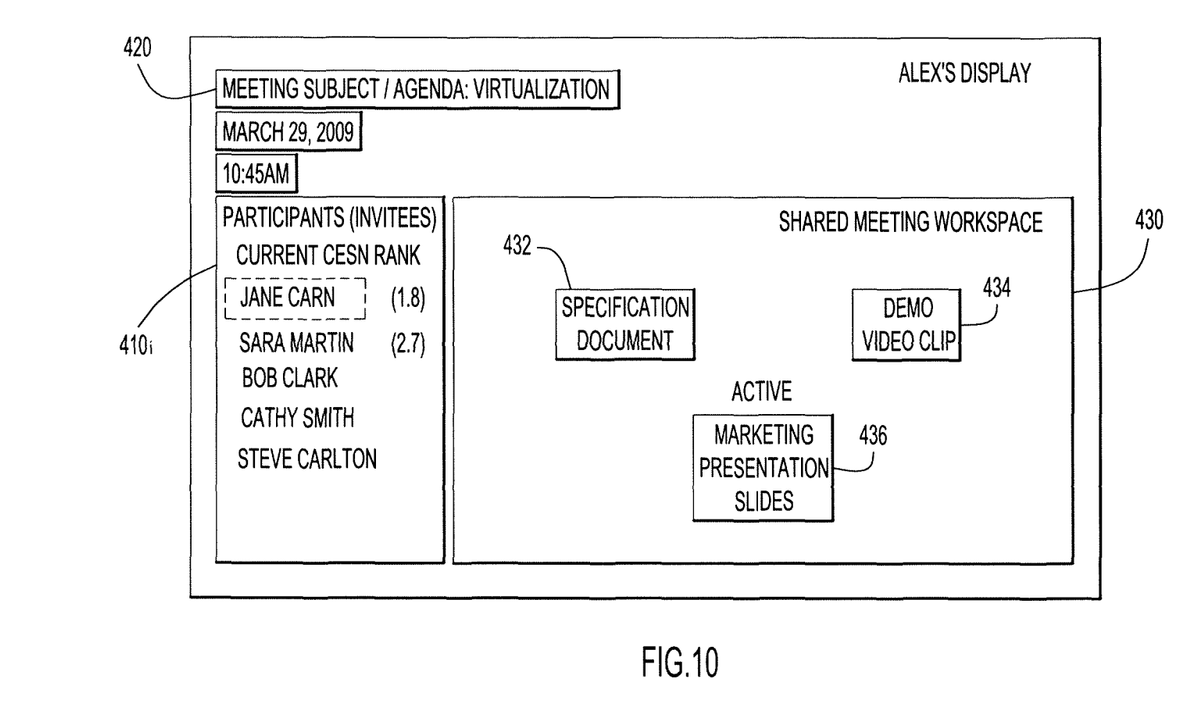
FIG. 10 is an example display screen from the first meeting participant's perspective based on the context of third meeting materials active during the meeting.

FIG. 10 is an example display screen from the first meeting participant's perspective (e.g., Alex's perspective) based on the context (e.g., virtualization) of third meeting materials (Marketing Presentation Slides) active during the meeting. In this case, Jane and Sara appear at the top of the CESN list $410_i$ with DOAs calculated as 1.8 and 2.7, respectively, since Jane is considered to be an expert and Sara knowledgeable in virtualization. Bob, Cathy and Steve appear towards the bottom of list since they are not considered to have relative expertise in virtualization. However, Bob and Cathy appear above Steve in the CESN list $410_i$ since they are more closely linked (e.g., DBP of 2.0) to Alex than is Steve.

Furthermore, according to another embodiment of the present invention, system 100 is configured to allow meeting participants to access profile information and other sources in the compilation of the information used to generate the context enhanced social network (e.g., expertise on the meeting topic, project team and organizational hierarchy, list of contacts etc.). For instance, a meeting participant may click on a name (e.g., Steve) displayed in the CESN list and browse his expertise on the meeting topic to identify what publications he has authored or how he is connected to other meeting participants. Optionally, policies can be put in place to govern the sources and weights used in the generation of networking information (e.g., the policies can be set to work under the privacy settings of each user).

As another example, if Alex, Bob and Cathy are located in different regional offices, the opportunity for face-to-face daily communication is limited and rare, especially if they are in different teams. However, when they are attending a meeting together, the network tuned to the meeting context (i.e., CESN list) provides information to Alex on how he is connected to Bob and Cathy. When the topic of discussion changes, the DOAs are recalculated and CESN lists are re-generated showing new associations (e.g., showing that one person has more expertise than the other with respect to the new topic). Thus, when meeting participants are not directly acquainted to each other, they can use the degree of association to form a connection to the participants. Therefore, both social distance and expertise are important factors when it comes to effectiveness of meetings.

As a further example, Joseph is a director of product development and needs to make a presentation to a customer (e.g., a research group at Indiana University) about a new and upcoming product feature (e.g., for Web2.0). Both Nancy and Steve sit on a panel of corporate experts for Web 2.0 and are also participants in the meeting. However, Nancy graduated from Indiana University. Therefore, Nancy has a higher degree of association with the research group of Indiana University with respect to the meeting context (e.g., Web 2.0) than does Steve. In this case, instead of asking Steve to lead the discussion, Joseph may select Nancy to lead the discussion. The system described herein allows Joseph to display this computed degree of association in the CESN list. Without having access to the degree of association information, Joseph would have no way to know that Nancy is better suited in this context as opposed to Steve who happens to be a technical lead on the subject matter.

The meeting server may be configured to allow a meeting participant to display other participants' degrees of associations (e.g., either on demand or by default) with proper permission and rights management (e.g., based on security and privacy settings of the individual participants). In still another variation, the meeting server re-computes the social network of participants on-demand based on a given context. This is useful if participants are interested in a context that is yet to be discussed or not part of the meeting and would like to see who their contacts are for that context.

Humans inherently develop a social network of their contacts and use expertise information to identify the best person to contact in a given scenario. A mere display of the list of experts on a context would be less useful than when this information is integrated with a social network. As research has shown, people tend to pay more attention to people who they know or share something in common. Even if a person is a reputed expert on the subject it may not provide him with the highest level of acceptance. Likewise, if a person is merely socially connected, his level of acceptance may not be highly regarded if he is not considered knowledgeable in the subject.

The techniques described herein improve the effectiveness of communication by showing how the participants are related to each other, thus making it easier to remember names and relations, and by enabling meeting participants to have a better awareness and interaction. In so doing, a more natural way of identifying the experts in different topics under discussion is provided, as well as a visual approach to identifying responsibilities of teams and individuals. An easy and quick mechanism may be provided to look up detailed information about the participants by linking the information used in determining ranking of the context enhanced social network.

Although the apparatus, method, and logic are illustrated and described herein as embodied in one or more specific examples, it is nevertheless not intended to be limited to the details shown, since various modifications and structural changes may be made therein without departing from the scope of the apparatus, method, and logic and within the scope and range of equivalents of the claims. Accordingly, it is appropriate that the appended claims be construed broadly and in a manner consistent with the scope of the apparatus, method, and logic, as set forth in the following.

What is claimed is:

1. A method comprising:
obtaining data for a plurality of meeting participants at a computing apparatus that is in communication with a user interface and display device associated with each meeting participant;
obtaining a meeting context for a meeting involving the meeting participants;
identifying expert knowledge associated with the meeting context and determining the expert knowledge of each meeting participant with regard to the context;
generating data representing social network relationships between the meeting participants;
calculating degrees of associations between meeting participants based on the expert knowledge of the meeting participants and the social network relationships, wherein calculating the degrees of associations comprises dynamically weighting the social network relationships between the meeting participants with reference to the meeting context to produce a single degree of association quantity between two meeting participants for the meeting context;
generating, for each meeting participant, data that represents single degree of association quantities between the meeting participant and the other meeting participants; and
displaying to each meeting participant the data that represents the single degree of association quantities between a specific meeting participant and the other meeting participants.

2. The method of claim 1, wherein obtaining a meeting context comprises:
detecting a change in the meeting context from a first meeting context to a second meeting context; and
repeating said identifying, determining, calculating, generating data that represents the degrees of associations between meeting participants, and displaying based on the second meeting context.

3. The method of claim 1, wherein obtaining the meeting context comprises:
obtaining the meeting context from a meeting agenda associated with the meeting.

4. The method of claim 1, wherein obtaining the meeting context comprises:
obtaining the meeting context from active material shared in an on-line meeting workspace managed by the computing apparatus.

5. The method of claim 1, wherein obtaining the meeting context comprises:
obtaining the meeting context from information supplied by a meeting participant during the meeting.

6. The method of claim 1, wherein identifying the expert knowledge comprises correlating expert knowledge criteria derived from the meeting context with expertise data for each meeting participant.

7. The method of claim 1, wherein generating data representing social network relationships between the meeting participants comprises acquiring data for the meeting participants from a participant social network profile database.

8. The method of claim 7, wherein acquiring data comprises retrieving data from one or more of:
project group team data, internal company directory data, internal company networking information, external social networking sites, and internet searches.

9. The method of claim 1, wherein calculating degrees of associations between meeting participants comprises applying weights based on confidence measures to data for the expert knowledge to produce a single degree of association quantity between two meeting participants with respect to the meeting context.

10. The method of claim 1, wherein displaying further comprises:
displaying to a first meeting participant data that represents single degree of association quantities between a second meeting participant and the other meeting participants.

11. The method of claim 1, wherein displaying comprises displaying the data that represents single degree of association quantities as numerical values.

12. The method of claim 1, wherein displaying comprises displaying the data that represents single degree of association quantities as a graphical image.

13. The method of claim 1, wherein displaying further comprises displaying sources of information used in determining the degree of association of a meeting participant.

14. An apparatus comprising:
- a network interface unit that is configured to enable communication over a network with a user interface and display device associated with each of a plurality of meeting participants;
- a memory configured to store data for a plurality of meeting participants involved in a meeting; and
- a data processor configured to:
  - obtain a meeting context for the meeting;
  - identify expert knowledge associated with the meeting context;
  - determine the expert knowledge of each meeting participant with regard to the meeting context;
  - generate data representing social network relationships between the meeting participants;
  - calculate degrees of associations between meeting participants based on the expert knowledge of the meeting participants and the social network relationships, wherein to calculate the degrees of associations, the social network relationships between the meeting participants are dynamically weighted with reference to the meeting context to produce a single degree of association quantity between two meeting participants with respect to the meeting context; and
- generate, for each meeting participant, data that represents single degree of association quantities between the meeting participant and the other meeting participants.

15. The apparatus of claim 14, wherein the data processor is configured to
- detect a change in the meeting context from a first meeting context to a second meeting context; and
- repeat said identify, determine, calculate, and generate data that represents the degrees of associations between meeting participants functions based on the second meeting context.

16. The apparatus of claim 14, wherein the data processor is configured to obtain the meeting context based on meeting agenda information associated with the meeting.

17. The apparatus of claim 14, wherein the data processor is configured to obtain the meeting context based on active material in a shared on-line meeting workspace managed by the apparatus.

18. Logic encoded in one or more tangible media for execution and when executed operable to:
- obtain data for a plurality of meeting participants at a computing apparatus that is in communication with a user interface and display device associated with each meeting participant;
- obtain a meeting context for a meeting involving the meeting participants;
- identify expert knowledge associated with the context and determine the expert knowledge of each meeting participant with regard to the context;
- generate data representing social network relationships between the meeting participants;
- calculate degrees of associations between meeting participants based on the expert knowledge of the meeting participants and the social network relationships, wherein to calculate the degrees of associations, the social network relationships between the meeting participants are dynamically weighted with reference to the meeting context to produce a single degree of association quantity between two meeting participants with respect to the meeting context;
- generate, for each meeting participant, data that represents single degree of association quantities between the meeting participant and the other meeting participants; and
- send data to the user interface and display device for a selected meeting participant that represents single degree of association quantities between the selected meeting participant and the other meeting participants.

19. The logic of claim 18, wherein the logic that obtains the meeting context comprises logic configured to:
- detect a change in the meeting context from a first meeting context to a second meeting context; and
- repeat said identify, determine, calculate, generate data that represents the degrees of associations between meeting participants, and send functions based on the second meeting context.

20. The logic of claim 18, wherein the logic that generates data representing social network relations comprises logic configured to acquire data for the meeting participants from a participant social network profile database.

21. The logic of claim 18, wherein the logic that calculates degrees of associations comprises logic that is configured to apply weights based on confidence measures to data based upon the expert knowledge to produce a single degree of association quantity between two meeting participants with respect to the meeting context.

* * * * *